United States Patent [19]
Jewell et al.

[11] Patent Number: 5,486,495
[45] Date of Patent: Jan. 23, 1996

[54] GERMANATE GLASS CERAMIC

[75] Inventors: John M. Jewell, Taunton, Mass.; Barry B. Harbison, Dunkirk, Md.; Ishwar D. Aggarwal, Springfield; Shyam S. Bayya, Alexandria, both of Va.

[73] Assignee: The United States of America as represented by the Secretary of the Navy, Washington, D.C.

[21] Appl. No.: 363,074

[22] Filed: Dec. 23, 1994

[51] Int. Cl.$^6$ .......................... C03C 10/02; C03C 3/253
[52] U.S. Cl. ................................ 501/10; 501/42
[58] Field of Search ........................ 501/10, 42

[56] References Cited

U.S. PATENT DOCUMENTS 4,703,019  10/1987  Abe et al. ..................... 501/42 X
5,305,414   4/1994  Higby et al. ................... 501/42 X

*Primary Examiner*—Karl Group
*Attorney, Agent, or Firm*—Thomas E. McDonnell; George A. Kap

[57] ABSTRACT

A germanate glass ceramic article which has better thermal and physical properties than the competing materials of zinc sulfide, spinel, and sapphire is made by mixing germanate ceramic glass components; melting the components to form a molten mass; cooling the molten mass to form a solid glass article; nucleating the solid article by heating it in the range of about 630°–790° C. for about 1–16 hours to develop nuclei in the article; and crystallizing the nucleated article by heating it, after nucleation, in the range of about ½ minute to about 8 hours to grow the nuclei to crystallites having an average diameter of less then about 1000 nanometer (nm); and cooling to form the glass ceramic.

13 Claims, No Drawings

GERMANATE GLASS CERAMIC

FIELD OF INVENTION

This invention relates to the field of germanate glass ceramics.

BACKGROUND OF INVENTION

Requirements for infrared domes and similar applications include hardness, infrared transparency, fracture toughness, and thermal shock resistance. There are currently three commercially available materials for use in applications such as infrared domes which can transmit in the infrared region of about 3–5 microns: ZnS, spinel, and sapphire. Although these materials are excellent in some respects, they all have important limitations.

ZnS has excellent transparency and is readily formed into the specific shapes required for windows and domes. However, this material is very soft and is abraded under normal operating conditions. The abrasion limits both the useful scope and the lifetime of products made from ZnS. Some improvement of the abrasion resistance is possible through the application of protective coatings, but the high temperatures which are rapidly generated during high speed acceleration leads to delamination. For instance, a speed of Mach 4, or about 2800 mph, generates a temperature of about 600° C.

Spinel has a slightly diminished transparency as compared to ZnS, i.e., the 5-micron radiation is partially absorbed. Since this material is about ten times harder than ZnS, it has greater erosion resistance. It is also better at resisting thermal shock because of higher fracture toughness than ZnS. However, difficulty in the fabrication of required shapes makes windows and domes of this material slightly more expensive than those made from ZnS.

Sapphire has a transparency about equal to that of spinel and has hardness and fracture toughness properties that are about 40% greater than those of spinel. Thus, windows or domes produced from sapphire are highly abrasion resistant and can be used for supersonic applications. However, this material is very expensive to produce and even more expensive to fabricate into the required configurations.

SUMMARY OF INVENTION

It is an object of this invention to produce a germanate glass ceramic with improved physical properties.

Another object of this invention is a germanate glass ceramic with improved thermal shock, improved erosion resistance, and improved fracture toughness, which glass ceramic can transmit in the infrared region of about 3–5 microns at a transmission above 80% for a 0.5 cm thick sample.

Another object of this invention is a germanate glass ceramic that can be produced at a small fraction of the cost of the commercially available materials currently used for infrared domes and other related applications.

Another object of this invention is a germanate glass ceramic that can be produced cheaply pursuant to conventional glass-forming procedures and that can be formed into intricate configurations.

These and other objects of this invention can be accomplished by an infrared-transmitting germanate glass ceramic article prepared by processing germanate glass ceramic components, including phase separating and/or nucleating agents, pursuant to conventional glass forming procedure to form a solid glass article, annealing the glass article, and subsequently nucleating and crystallizing the article to form the germanate glass ceramic. The resulting product is nearly all crystalline, maintains a high infrared transparency and has improved thermal and mechanical properties.

DETAILED DESCRIPTION OF INVENTION

This invention pertains to a novel non-silicate germanate glass ceramic article and to a method for making same.

The article is a glass ceramic that is crystalline to a level of above 98%, is made from a germanate glass and has improved thermal and physical properties. The following Table A compares an average of improved properties of the novel glass ceramic with the properties of competing materials.

TABLE A

| Property | Germanate Parent Glass | Germanate Glass Ceramic | ZnS | Spinel | Sapphire |
| --- | --- | --- | --- | --- | --- |
| Fracture Toughness (MPa-m$^{1/2}$) | 0.7 | 2.6 | 1.0 | 1.9 | 2.0 |
| Thermal Expansion (ppm/K) | 8.0 | 5.6 | 6.0 | 5.6 | 6.6 |
| Hardness (kg/mm$^2$) | 390 | 570 | 160 | 1600 | 1880 |
| Erosion Resistance Threshold Velocity (m/S) | — | 460 | 190 | 390 | 490 |
| Thermal Shock Figure of Merit (W/m) | — | 3.4 | 0.8 | 1.4 | 2.1 |
| Normalized Cost | — | 0.1–0.2 | 1 | 1 | 2.5 |

In Table A, above, the term "Germanate Parent Glass" refers to the precursor glass for the glass ceramic material of the present invention. The term "Germanate Glass Ceramic" refers to glass ceramic material of the present invention. In the above table, the 2.6 MPs-m$^{1/2}$ fracture toughness for the glass ceramic of this invention exceeds the 0.7 MPa-m$^{1/2}$ fracture toughness of the germanate parent glass. Thus, subjecting a germanate glass to nucleation and crystallization can increase the fracture toughness of a germanate glass several fold.

The germanate glass ceramic of this invention has thermal shock in terms of figure of merit in the approximate range of 2.5–4.5 W/m, preferably 3–4 W/m; erosion resistance in terms of threshold velocity is in the approximate range of 350–1000 m/s, preferably 500–800 m/s; fracture toughness is 1.5–4.5 MPa-m$^{1/2}$, typically 2–4 MPa-m$^{1/2}$.

The method of the present invention includes the steps of mixing germanate glass ceramic components; melting the components to form a molten mass; cooling the molten mass to form a solid glass article; annealing the glass article;

nucleating the solid article by heating it to an elevated temperature for a period of several hours to develop nuclei in the article; and crystallizing the nucleated article by heating it, after nucleation, at an elevated temperature for a period of at least one minute to grow the crystallites to an average diameter of less than about 1000 nanometers (nm); and cooling to form the glass ceramic with improved thermal and physical properties. Phase separation may be needed to allow nucleation to proceed. Phase separation can be effected by addition of a phase separation agent or by heating or upon cooling the parent glass to cause phase separation. When phase seaparation takes place, nuclei form on the separated phase followed by crystallization.

The germanate glass ceramic composition includes germanate glass components, nucleating agents, and, optimally, phase separation components. There can be at least three, preferably at least four germanate glass components although the glass ceramic article can contain more components than specified herein.

The primary germanate glass components include germanium oxide ($GeO_2$); barium oxide (BaO), which is uaually initially in the form of barium carbonate ($BaCO_3$), which converts to an equivalent mol amount of barium oxide (BaO) on heating, and gallium oxide ($Ga_2O_3$). The secondary germanate glass components include calcium oxide (CaO), zinc oxide (ZnO), alumina ($Al_2O_3$), gadolinium oxide ($Gd_2O_3$), lead oxide (PbO), indium oxide ($In_2O_3$), bismuth oxide $Bi_2O_3$), lanthanum oxide ($La_2O_3$), and yttrium oxide ($Y_2O_3$). The amount of germanium oxide is 25–80, preferably 35–70 mol percent; amount of barium carbonate is 10–60, preferably 15–45 mol percent; and amount of gallium oxide is 5–30, preferably 10–20 mol percent. These amounts are based on total number of mols of germanium oxide, barium carbonate, and gallium oxide used in making the glass ceramic. The secondary germanate glass components can be used in conventional amounts.

To avoid crystallization when forming the glass, the mole ratio of barium carbonate to gallium oxide should be in the range of about 4:1 to 1:1.

The germanate glass ceramic composition includes about 0.1–20, preferably 2–10 mole percent, based on the germanate glass components, of at least one nucleating agent. If an insufficient amount of a nucleating agent is used, nucleation will be insignificant and an insufficient number of crystals will be produced to significantly improve the properties of the germanate ceramic. If too much nucleating agent is used, glass will not be formed from the germanate glass ceramic composition. Typical nucleating agents include arsenic oxide ($As_2O_3$), bismuth oxide ($BiO_3$), phosphorus pentoxide ($P_2O_5$), hafnium oxide ($HfO_2$), indium oxide ($In_2O_3$), antimony oxide ($Sb_2O_3$), tantalum oxide ($Ta_2O_5$), titanium oxide ($TiO_2$), and zirconium oxide ($ZrO_2$). A combination of the nucleating agents can constitute a nucleating agent.

The germanate glass ceramic composition includes about 0.1–20 mole percent of a phase separation agent such as indium oxide ($In_2O_3$), phosphorus oxide ($P_2O_3$), antimony oxide ($Sb_2O_3$), and bismuth oxide ($Bi_2O_3$). The amount of the phase separation agent is based on the total of the germanate glass components and the phase separation agent.

It should be understood that other components can be included in making the glass ceramic article disclosed herein as long as they do not significantly change the physical properties of the article.

Components of the germanate glass ceramic composition are typically powders that are mixed sufficiently in a suitable receptacle to distribute the components. Mixing time can be on the order of about one-half hour if a mixing tumbler is used.

After mixing the components, the resulting mixture is transferred to a vessel that can withstand high germanate glass melting temperatures. Such a vessel is typically a platinum boat that can be preheated before the mixture is transferred thereto. To melt the glass ceramic composition disposed in a platinum boat, a furnace is heated to about 1350°–1600° C., an inert atmosphere is provided in the furnace, and the boat is placed in the furnace for about ½–3 hours until the contents of the boat melt. Once contents of the boat are melted, the boat is removed from the furnace and conventional techniques can be used to produce a glass article of any size or shape. A typical technique of preparing an article involves pouring the molten germanate glass into a mold, forming the glass into the desired shape, and cooling to solidify the molten glass.

The solidified glass in the form of an article is then annealed to relieve inherent stresses therein. This can be done by heating the glass article to about the glass transition temperature ($T_g$) of the glass and holding it at that temperature for an amount of time sufficient to substantially relax the glass, typically about 10 minutes to 4 hours followed by slow cooling. At this point, the glass is amorphous and not a glass ceramic. Annealing of the glass can be avoided by cooling the melt directly to the nucleation temperature. Stresses develop in the solid glass upon cooling the melt to below $T_g$.

To convert the glass from amorphous to essentially all crystalline, i.e., to convert the glass to glass ceramic, the glass is subjected to nucleation followed by crystallization.

Nucleation throughout the germanate glass can be accomplished by heating the germanate glass article to a temperature range of about 600–900, preferably 650°–750° C. in a time period of 1–16, preferably 2–10 hours. The glass transition temperature ($T_g$) for the germanate glass is above about 600° C. and for nucleation to occur, the glass is heated above $T_g$. Nucleation can be represented as a bell-shaped curve with nucleation starting at about 600° C. and terminating at about 900° C., with the maximum nucleation rate taking place at the maximum point on the nucleation curve, about 750° C. It is believed that a minimum of about $10^{11}$–$10^{12}$ nuclei/$cm^3$ may be needed to realize significant property improvements after crystallization in the germanate glass ceramic article. The nuclei are below 1 micron, typically below 100 nanometers in average diameter.

It may be necessary to cause phase separation to take place in the glass to provide a phase on which nuclei can form. Phase separation can be induced by adding to the germanate glass ceramic composition a phase separation agent which causes phase separation to take place when the glass is subjected to an energetic force. Phase separation appears to facilitate nuclei formation on the separated phase.

It is possible for a nucleation agent to function as a phase separation agent, depending on the combination and amounts of the components used. If a nucleation agent can function as a phase separation agent, then its phase separation function preempts its nucleation function and the agent functions as a phase separation agent. In such a case, two or more nucleation agents should be used to allow one to function as a phase separation agent and another to function as a nucleation agent.

In order to induce phase separation, it may be necessary to heat or cool the glass. Application of an energetic force, apparently facilitates or expedites phase separation. Energetic force can be heat treatment above $T_g$ of the glass.

Neither nucleation nor phase separation need to commence at room temperature but can commence at any temperature as long as the objectives of nucleation or phase separation are achieved.

Crystallization or growth of nucleated crystals is typically carried out by heating nucleated glass to a temperature in the approximate range of 750°–1200° C. for a period of ½ minute to 8 hours, preferably 900°–1100° C. for a period of 1 minute to 2 hours. The crystal growth rate can be represented as a bell-shaped curve with crystallization starting at about 750° C. and terminating at about 1200° C., with the maximum crystal growth rate taking place at the maximum point on the growth rate curve, about 975° C. Melting of the germanate glass commences at about 1200° C. Although the crystal growth rate curve is generally at a higher temperature range than is the nucleation curve, the upper temperature range of the nucleation curve overlaps the lower temperature range of the crystallization curve. The overlap means that at the overlapping temperatures, nucleation and crystallization proceed simultaneously although at different rates, depending on the location on the respective curves.

The crystals in glass ceramic are typically different chemically from the nuclei although they can be the same as the nuclei. In a glass ceramic containing germanium oxide, barium oxide and gallium oxide, the crystals are germanium, barium, and gallium oxide and their average size is typically less than about 1000 nanometers and larger than about 20 nanometers. The crystals should not be too large since the crystal oversize can lead to diminished infrared transparency of the glass ceramic. The size of the crystals should be less than the wavelength of the transmitted light. If the crystal size exceeds the wavelength of the transmitted light, light will be scattered and/or absorbed and transparency will diminish. Additionally, regardless of crystal size, improvement in the thermal and physical properties in the glass ceramic typically requires that the glass ceramic be in excess of 98% by volume crystalline, and preferably essentially 100% crystalline.

After crystallization, the glass ceramic is in the solid state and is cooled slowly to about room temperature. Since a germanate glass is essentially solid at about 1100° C. as it is cooled from a higher temperature, it is possible to carry out nucleation and crystallization while the glass is in the solid state. In fact, typically, nucleation and crystallization are carried out on a germanate glass that is in a solid state.

The invention having been generally described, the following examples are given as particular embodiments of the invention to demonstrate the practice and advantages thereof. It is understood that the examples are given by way of illustration and are not intended to limit in any manner the specification or any claims that follow.

Example I

This example demonstrates preparation of a germanate glass ceramic from a germanate glass wherein nucleation was achieved without phase separation.

The following batch of germanate glass ceramic was prepared, as summarized in Table I, below:

TABLE I

| Oxide | Weight Percent | Mole Percent | Batch Materials | Weight (grams) |
|---|---|---|---|---|
| Base Glass | | | | |
| BaO | 47.12 | 42.9 | $BaCO_3$ | 24.260 |
| $Ga_2O_3$ | 22.33 | 17.0 | $Ga_2O_3$ | 9.131 |
| $GeO_2$ | 30.05 | 40.1 | $GeO_2$ | 12.019 |
| Additions | | | | |
| $Sb_2O_3$ | 5.22 | 2.5 | $Sb_2O_3$ | 2.088 |
| $TiO_2$ | 1.72 | 3.0 | $TiO_2$ | 0.688 |

The batch was mixed in a tumbler for about one-half hour and then melted in a platinum crucible at about 1400° C. over a period of about one hour. As the batch was melted, dry nitrogen gas was flown over the batch to keep the water interaction therewith to a minimum. The melted batch was then quenched to about room temperature by dipping the bottom of the crucible in water, whereby a solid, amorphous glass was formed. For annealing, the glass was reheated to about 675° C. for about one hour and then slowly cooled at about 1° C./min to 400° C. followed by furnace cooling to about room temperature.

The glass was then nucleated by reheating to about 710° C. and holding at 710° C. for about four hours and then crystallized by heating the glass at about 10° C. per minute to about 1000° C. and holding at 1000° C. for about one minute.

The nucleation and crystallization heat treatments produced germanate glass ceramic that was over 98% by volume crystalline. The resulting glass ceramic showed infrared transmission beyond 5 microns; its fracture toughness over the base glass increased from 0.7 to 2.6 $MPa\text{-}m^{1/2}$; its thermal shock was 3.4 W/m, exceeding even that of sapphire; its erosion resistance was 460 m/s, which was below that for sapphire but above that of zinc sulfide and spinel; its thermal expansion over the base glass decreased from 8 to 5.6 ppm/K; its Vicker's hardness over the base glass increase from 390 to 570 $kg/mm^2$; and its normalized cost was 0.1–0.2 compared to 1 and 2.5 for the competing materials.

Example II

This example demonstrates preparation of a glass ceramic from a germanate glass wherein nucleation was achieved after phase separation by using a phase separation agent as a component of the germanate glass ceramic composition.

The following batch of germanate glass ceramic was prepared, as summarized in Table II, below:

TABLE II

| Oxide | Weight Percent | Mole Percent | Batch Materials | Weight (grams) |
|---|---|---|---|---|
| Base Glass | | | | |
| BaO | 17.00 | 15.0 | $BaCO_3$ | 9.032 |
| $Ga_2O_3$ | 10.72 | 7.5 | $Ga_2O_3$ | 4.289 |
| $In_2O_3$ | 15.88 | 7.5 | $In_2O_3$ | 6.354 |
| $GeO_2$ | 55.85 | 70.0 | $GeO_2$ | 22.339 |
| Additions | | | | |
| $TiO_2$ | 5.0 | 8.2 | $TiO_2$ | 2.101 |

The batch was mixed in a tumbler for about one-half hour and then melted in a platinum crucible at about 1600° C.

over a period of about one hour. During melting of the batch, nitrogen flush was used to minimize water interaction with the batch. The melted batch was then quenched to about room temperature by dipping the bottom of the platinum crucible in water, whereby a solid, amorphous glass was formed. For annealing, the glass was reheated to about 675° C. for about one hour and then slowly cooled at about 1° C./min to 400° C. followed by furnace cooling to about room temperature.

Nucleation herein was preceded by phase separation of an indium-rich phase of BaO-10.7%, $Ga_2O_3$-10.0%, $In_2O_3$-28.9%, and $GeO_2$-50.4% from original glass composition of BaO-17.3%, $Ga_2O_3$-10.8%, $In_2O_3$-13.5%, and $GeO_2$-58.4%, all in mol percent, by heating the glass above its $T_g$ to abut 725° C. and holding it there for about two hours. About 10–20% by volume of the $In_2O_3$-phase in the form of solid droplets of about 0.1–0.5 microns in size dispersed in a solid parent matrix of BaO—$Ga_2O_3$—$GeO_2$. The phase-separated glass was then heated to about 1000° C. and held there for about 1 minute for crystallization to be carried out.

The resulting germanate glass ceramic was more than 98% by volume crystalline, transmitted in the infrared region of 3–5 microns at a transmission in excess of 80%, had thermal shock of 3.6 W/m, erosion resistance of 470 m/s, thermal expansion of 5.8 ppm/K, hardness of 590 kg/mm$^2$, fracture toughness of 2.3 MPa/m$^{1/2}$, and was produced at a small fraction of the cost compared to a competing material. For infrared window and dome applications, the more important parameters are thermal shock and cost.

Many modifications and variations of the present invention are possible in light of the above techniques It is, therefore, to be understood that within the scope of the appended claims, the invention may be practiced otherwise than as specifically; described.

What is claimed is:

1. A glass ceramic article comprising 25–80 mol percent germanium oxide, 10–60 mol percent barium oxide and 5–30 mol percent gallium oxide, based on the total mols of germanium oxide, barium oxide and gallium oxide, wherein the total of the germanium oxide and barium oxide is more than 50 mol percent, which article is over 98% by volume crystalline.

2. The article of claim 1 herein said article has thermal shock in the range of about 2.5–4.5 W/m, erosion resistance in the range of about 350–1000 m/s, and fracture toughness in the range of about 1.5–4.5 MPa-m$^{1/2}$.

3. The article of claim 2 which transmits in the infrared region of about 3–5 microns, comprising 35–70 mol percent germanium oxide, 15–45 mol percent barium oxide; and 10–20 mol percent gallium oxide, said article has thermal shock in the range of about 3–4 W/m; erosion resistance in the range of about 500–800 m/s; fracture toughness in the range of about 2–4 MPa-m$^{1/2}$.

4. The article of claim 1 which includes about 0.1–20 mol percent of a nucleating agent, based on total mols of germanium oxide, barium carbonate, and gallium oxide used to make said article.

5. The article of claim 4 wherein said nucleating agent is selected from the group consisting of arsenic oxide, bismuth oxide, phosphorous pentoxide, hafnium oxide, indium oxide, antimony oxide, tantalum oxide, zirconium oxide, and mixtures thereof.

6. The article of claim 4 which includes about 0.1–20 mol percent of a phase separating agent, based on the total mols of germanium oxide, barium oxide, and gallium oxide.

7. The article of claim 6 wherein said phase separating agent is selected from the group consisting of indium oxide, phosphorus oxide, bismuth oxide and mixtures thereof.

8. The article of claim 5 wherein the crystals in said glass ceramic article have a diameter above about 20 nm and below about 1000 nm.

9. The article of claim 6 containing at least two phases.

10. A glass ceramic article which is over 98% by volume crystalline and which can transmit in the infrared region of about 3–6 microns, said article comprising 25–80 mol percent germanium oxide, 10–60 mol percent barium oxide and 5–30 mol percent gallium oxide, based on total mols of germanium oxide, barium oxide, and gallium oxide.

11. The article of claim 10 comprising 35–70 mol percent germanium oxide, 15–45 mol percent barium oxide; and 10–20 mol percent gallium oxide, said article has thermal shock in the range of about 3–4 W/m; erosion resistance in the range of about 500–800 m/s; fracture toughness in the range of about 2–4 MPa-m$^{1/2}$.

12. The article of claim 10 which includes 0.1–20 mol percent of a nucleating agent based on total mols of germanium oxide, barium oxide, and gallium oxide; said nucleating agent is selected from the group consisting of arsenic oxide, bismuth oxide, phosphorous pentoxide, hafnium oxide, indium oxide, antimony oxide, tantalum oxide, zirconium oxide, and mixtures thereof; and the crystals in said glass ceramic article have a diameter above about 20 nm and below about 1000 nm.

13. The article of claim 12 which includes about 0.1–20 mol percent of a phase separating agent based on total mols of germanium oxide, barium oxide, and gallium oxide, said article containing at least two phases.

* * * * *